Oct. 27, 1970    B. STORCH    3,535,846
MEANS FOR ANCHORING STONE VENEERS TO STRUCTURAL STEEL MEMBERS
Filed Nov. 8, 1968    2 Sheets-Sheet 1

INVENTOR:
BERNARD STORCH
BY
Breitenfeld & Levine
ATTORNEYS

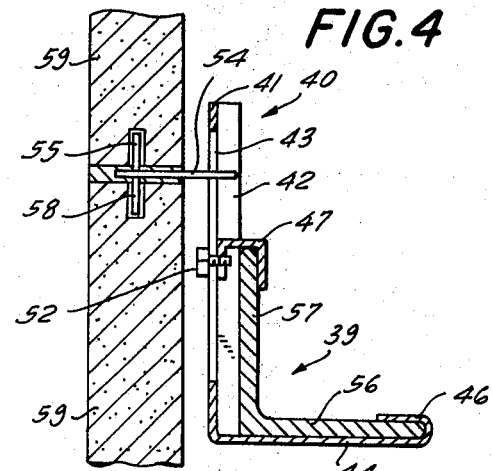
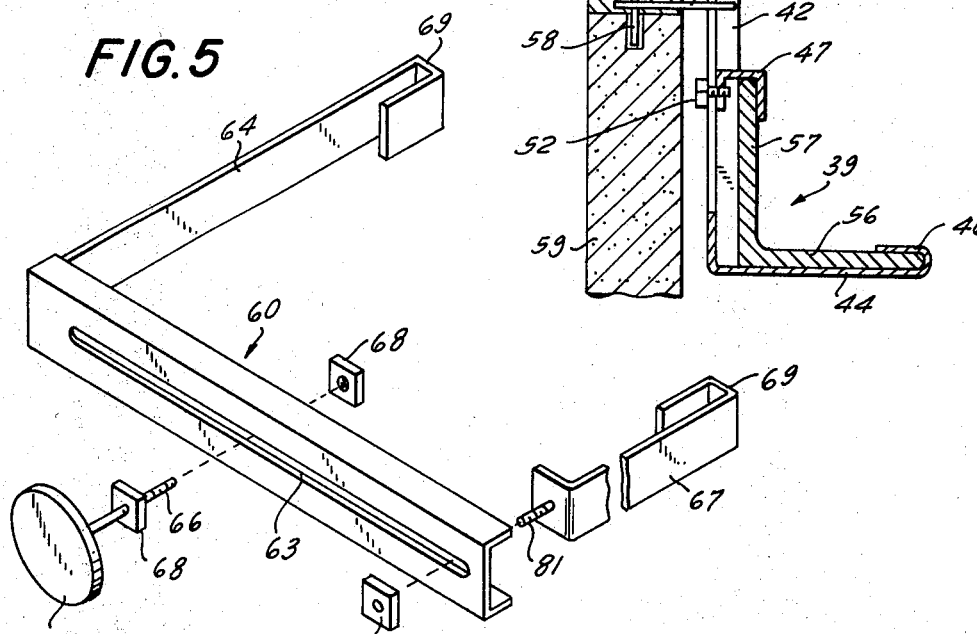
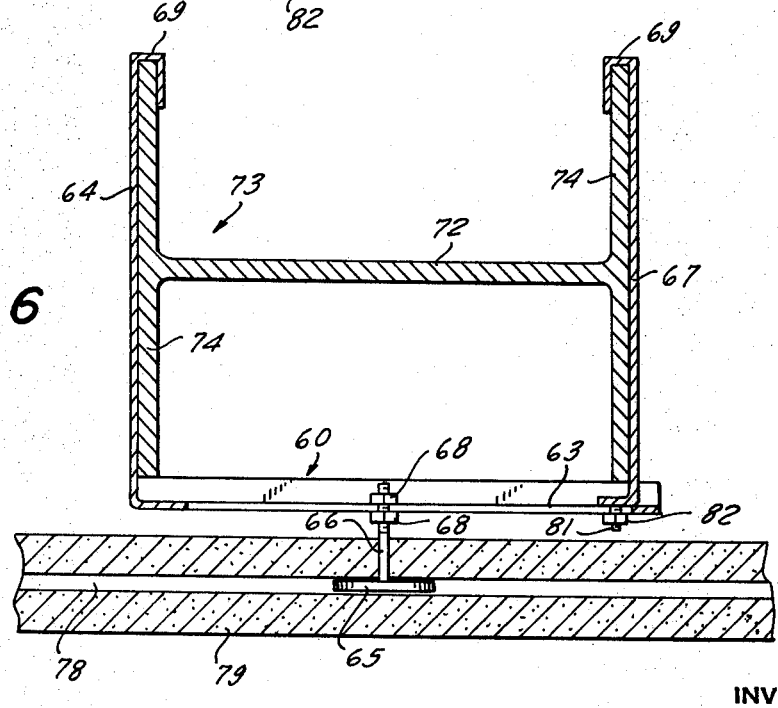

United States Patent Office 3,535,846
Patented Oct. 27, 1970

3,535,846
MEANS FOR ANCHORING STONE VENEERS TO STRUCTURAL STEEL MEMBERS
Bernard Storch, 81—57 259th St.,
Floral Park, N.Y. 11004
Filed Nov. 8, 1968, Ser. No. 774,288
Int. Cl. E04b 1/38; E04c 5/00
U.S. Cl. 52—698
8 Claims

ABSTRACT OF THE DISCLOSURE

Bracket arranged against structural member, e.g. I-beam, in space between structural member and stone veneer. Clamping arms project inwardly from bracket to grasp flange of structural member, spacing between arms being adjustable. Anchor for engaging veneer projects outwardly from bracket and is adjustable along length of bracket.

---

This invention relates to building construction, and more particularly to means for anchoring a stone veneer to a structural steel framework.

In the construction of buildings, it is well known practice to first assemble a framework of structural steel members having I-shaped and L-shaped cross-sections, and to face the framework with a veneer of stone or marble slabs. In such constructions, it is necessary to provide means for anchoring the veneer to the structural framework.

Conventionally, anchors are provided at the required locations by drilling holes in the flanges of the structural members through which the anchors pass preparatory to attachment to the structural members. Should an anchor be required at a location beyond the contours of the structural members in the framework, a plate must be welded to one of the structural members, and a hole drilled in the plate at the location in which the anchor is needed. While the conventional technique accomplishes the desired end of anchoring the veneer to the structure, the drilling of holes and welding of plates are extremely time consuming operations which increase the cost of, and delay, construction.

It is therefore an object of the invention to provide an anchoring means for use in such buildings which eliminates the necessity of drilling and welding.

It is a further object of the invention to provide anchoring means for connecting veneer units to an I-shaped structural member regardless of whether the veneer is parallel to the flanges or the web of the member.

It is an additional object to provide an anchoring means for connecting veneer units to L-shaped structural members.

It is another object of the invention to provide an anchoring means adjustable in size so that a single anchoring unit can be secured to structural members of various dimensions.

To achieve these objectives, the anchoring means includes a bracket for location in the space between the stone veneer and the structural member. A pair of clamping arms project inwardly from the bracket along opposite sides of the member, and grip the flange or flanges of the member to secure the bracket to the member. Thus, the bracket can be fixed to the structural member at any desired point along the length of the latter. Furthermore, one of the clamping arms may be integral with the bracket, and the spacing between the clamping arms is adjustable to accommodate structural members of different sizes. An anchor or anchors project outwardly from the bracket and engage the veneer units, the position of the anchor being adjustable along the length of the bracket.

Additional objects and advantages of the invention will be apparent from the following description in which reference is made to the accompanying drawings.

In the drawings:

FIG. 4 is a vertical cross-sectional view showing the anchoring means of FIG. 3 secured to an L-shaped structural member;

FIG. 5 is an exploded perspective view of still another anchoring means according to this invention; and FIG. 6 is a horizontal cross-sectional view showing the anchoring means of FIG. 5 secured to two flanges of an I-shaped steel column.

Figure 1:
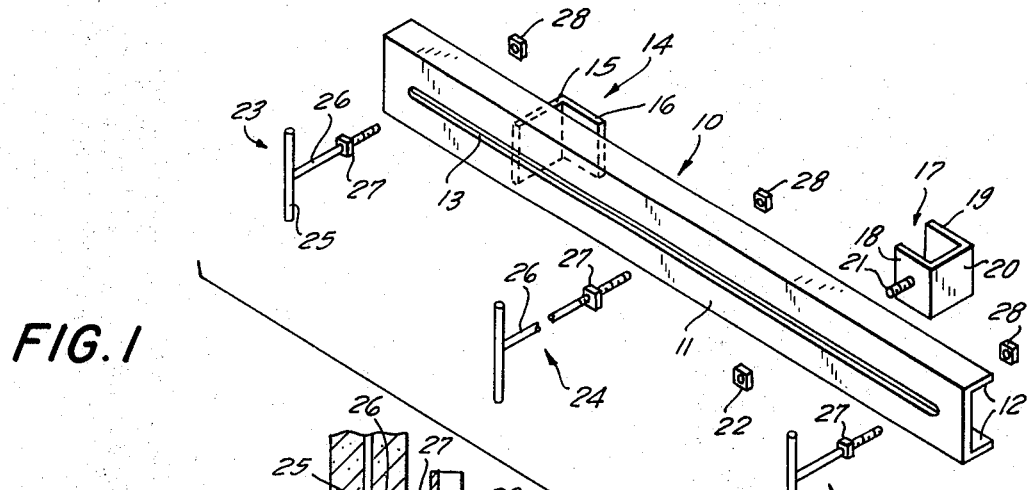
FIG. 1 is an exploded perspective view of an anchoring means according to the present invention.
Figure 2:
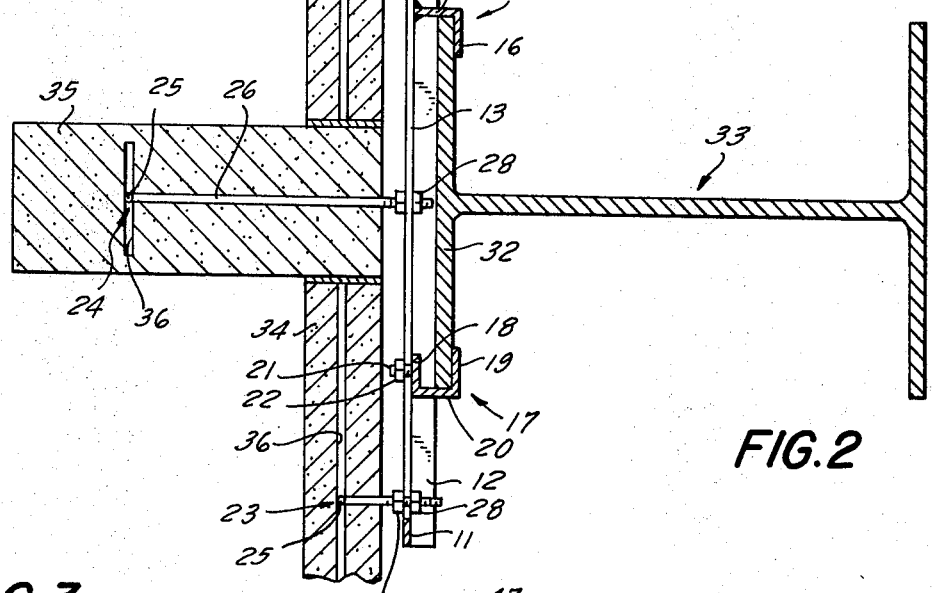
FIG. 2 is a horizontal cross-sectional view showing the anchoring means of FIG. 1 secured to one flange of an I-shaped steel column.

The embodiment of the invention illustrated in FIGS. 1 and 2 includes an elongated bracket 10 having a channel shape, defining a central region 11 and two rearwardly projecting margins 12. The central region 11 is formed with a slot 13 extending along almost the entire length of the bracket. Welded to the bracket 10, between the margins 12 and spaced from the ends of the bracket, is an L-shaped clamping arm 14, one leg 15 of which is perpendicular to the longitudinal axis of the bracket 10 and is a little longer than the depth of the bracket channel, the other leg 16 being parallel to the bracket axis and located outside the channel. A second C-shaped clamping arm 17 is adapted to fit slidably between the margins 12 of the bracket with its legs 18 and 19 parallel to the bracket axis and its central portion 20 perpendicular thereto, this latter portion also being a little longer than the depth of the channel. A threaded stud 21, projecting from the outer face of leg 18, extends slidably through slot 13 and is adapted to be engaged by a nut 22.

One or more anchors 23 and 24 are provided, the anchors in the example of FIGS. 1 and 2 being T-shaped elements each having a cross-bar 25 and a stem 26. The stem of each anchor has a threaded and slidable within slot 13, and a pair of nuts 27 and 28 are adapted to engage the stem.

As may be seen in FIG. 2, the anchoring means of the type just described is used with a veneer, or facing wall, parallel to the flange 32 of an I-shaped beam or column 33. The veneer is composed of a number of individual blocks or units 34 and 35 made of material such as stone, marble, or brick, which may or may not be joined together by cement or mortar. A groove 36 is formed in the edges of each veneer unit, the grooves being of sufficient depth to receive the cross-bars 25 of the anchors 23 and 24.

The bracket 10 is secured to the member 33 by first loosening the nut 22 and moving the clamp 17 away from the clamp 14 so that the spacing between them exceeds the width of flange 32. The edges of the margins 12 are then placed against the outer surface of flange 32 and the bracket is moved downwardly (in FIG. 2) until the leg 15 engages the edge of flange 32. The clamp 17 is then moved with respect to bracket 10 toward the clamp 14 until the portion 20 engages the opposite edge of flange 32, whereupon the nut 22 is tightened on stud 21 to fix the clamp 20 in place on the bracket 10. The legs 16 and 19, engaging the rear face of flange 32 prevent the bracket from moving away from the flange.

It will be appreciated that the bracket 10 may be secured to the member 33 in any desired position of longitudinal adjustment along the flange 32. In this way, the bracket can be arranged precisely in alignment with the joint between two adjacent veneer units 34. After the bracket is secured in place, the anchors 23 are adjusted along slot 13 to the desired locations, the cross-bars 25 are located in grooves 36 of veneer slabs 34, and the anchors are fixed in place by tightening nuts 27 and 28. Thus, with bracket 10 secured to member 33, and cross-bars 25 of anchors 23 embedded between adjacent slabs 34, a connection has been effected between the structural framework and the veneer. In this example, anchor 24 has been shown as having a relatively long stem 26 so that it may anchor a block 35 which projects perpendicularly from the plane of the veneer for aesthetic reasons. Also, the anchors 23 engage slabs 34 at points beyond the width of flange 32. This is possible since bracket 10 and slot 13 are longer than the width of flange 32 measured in a direction parallel to the plane containing the slabs 34.

Figure 3:
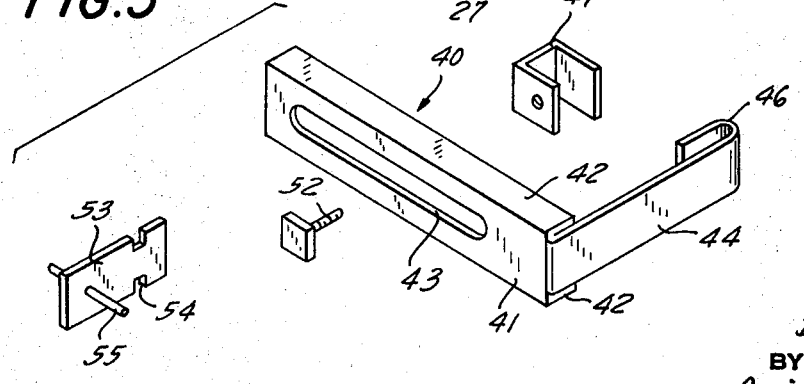
FIG. 3 is an exploded perspective view of another anchoring means according to this invention.

The anchoring means shown in FIGS. 3 and 4 is intended for attachment to an L-shaped, or angle, structural member 39. The illustrative anchoring means includes a channel-shaped bracket 40 having a central region 41, formed with a slot 43, and two bend-back margins 42. A relatively long clamping arm 44, integral with bracket 40, extends rearwardly from the bracket, and is provided with a hook shaped bend 46 at its rear end. A second, relatively short, C-shaped clamping arm 47 is adapted to fit slidably between the margins 42 of the bracket 40. The arm 47 is provided with a threaded hole 51 in one leg, adapted to accommodate a screw 52 which slidably fits through slot 43. An anchor 53 is also slidably arranged within slot 43, the anchor comprising a rigid strip having notches 54 formed in its opposite longitudinal edges. A fixed pin 55 projects perpendicularly from both faces of the strip. The notches 54 slidably engage the longitudinal edges of the slot 43.

The anchoring means just described is applied to the L-shaped member 39, as shown in FIG. 4, by placing the hooked end 46 of arm 44 over the edge of the horizontal flange 56, so that the arm 44 extends along the outer face of flange 56 and the bracket 40 extends along the front face of flange 57. The adjustable clamping arm 47 is then moved with respect to the bracket 40, toward arm 44, until it engages the upper edge of flange 57, at which point the screw 52 is tightened to complete the securement of the anchoring means to the member 39. The anchor 54 is then adjusted along bracket 40 so that its pin 55 seats within the grooves 58 of veneer slabs 59. It will be appreciated that since the bracket 40 can be secured at any desired point along member 39, and anchor 54 can be adjusted along bracket 40, the pin 55 of anchor 54 can be located at a position in which it will be most effective. Of course, the bracket 40 may be made as long as necessary. In the present example, the bracket, and slot 43 within it, are longer than the width of flange 57 so that anchor 54 may be located beyond the width of flange 57.

The anchoring means of FIGS. 5 and 6 is similar to that of FIGS. 3 and 4, except that the length of the adjustable clamping arm 67 is made equal to the length of the clamping arm 64 integral with the bracket 60. Both arms 64 and 67 are bent to form hooks 69 at their rear ends. The anchor in this example includes a circular disk 65 from the center of which a threaded stud 66 projects, the stud being slidable within slot 63 of the bracket and fitted with two nuts 68.

The anchoring means just described is used to anchor a veneer which extends parallel to the web 72 of an I-shaped beam or column 73. Each arm 64 and 67 extends along the outer face of one flange 74 of the member 73 and its end 69 hooks around the rear edge of its respective flange. The adjustable arm 67, which is slidable toward and away from integral arm 64, is fixed in position by tightening nut 82 on stud 81. The anchor is then positioned along the length of slot 63, and fixed in position by tightening nuts 68. The disk 65 is accommodated within the grooves 78 of two adjacent slabs 79 (only one being shown in FIG. 6).

It may be mentioned that the structural members 33, 39 and 73 may be either horizontal or vertical members. In addition, each anchoring means described may have one clamping arm integral with the bracket, or both clamping arms may be adjustable along the length of the bracket, or one clamping arm may be a separate member welded to the bracket. Furthermore, the particular anchors shown with one anchoring means may be used with any of the others.

The invention has been shown and described in preferred form only, and by way of example, and it is understood, therefore, that many variations may be made in the invention which will still be comprised within its spirit.

What is claimed is:

1. For use in construction involving structural steel members faced with a veneer, the structural steel members having flanges and a width measured in a direction parallel to the plane containing said veneer, means for anchoring said veneer to said members comprising:

an elongated bracket adapted to be placed against one of said structural members so as to be disposed in the spacing between said structural member and said veneer, and in a position perpendicular to the length of said member, said bracket being longer than said width of said structural member so that it projects beyond the width of said member, a pair of clamping arms projecting inwardly from said bracket along opposite sides of said member, a portion of each arm fitting around one edge of a flange of said structural member, and at least one of said arms being movable toward and away from the other to adjust the spacing between said arms to accommodate structural members of various sizes.

means for securing said movable arm to said bracket in any desired position of adjustment, an anchor projecting outwardly from said bracket and means for positioning said anchor at various points along the length of said bracket, including points beyond the width of said structural member, said anchor being adapted to engage a unit of said veneer, whereby said bracket may be secured in any selected location along the length of said structural member and said anchor may be arranged in any selected location along the length of said bracket.

2. An anchoring means as defined in claim 1 wherein said positioning means includes a longitudinal slot in said bracket, said slot being longer than said width of said structural member, each of said anchor and movable arm being slidable along said slot to its desired position of adjustment.

3. An anchoring means as defined in claim 1 wherein one of said arms is integral with said bracket.

4. An anchoring means as defined in claim 1 wherein said arms are of equal length.

5. An anchoring means as defined in claim 1 wherein one of said arms is longer than the other.

6. An anchoring means as defined in claim 1 wherein said structural member has an I-shaped cross-section, said bracket is arranged parallel to the outer face of one flange of said member, and each of said arms extends along one edge and the inner face of said one flange.

7. An anchoring means as defined in claim 1 wherein said structural member has an I-shaped cross-section, said bracket is arranged parallel to the web of said member, and each of said arms extends along the face and one edge of one flange of said member.

8. An anchoring means as defined in claim 1 wherein said structural member has an L-shaped cross-section, said bracket is arranged parallel to one flange of said member, and each of said arms extends around the edge of one of said flanges.

References Cited

UNITED STATES PATENTS

| 752,996 | 2/1904 | Nissenson | 248—72 |
| 919,558 | 4/1909 | Doran | 248—72 |
| 1,302,544 | 5/1919 | Hartburg | 248—72 |

FOREIGN PATENTS 675,035  7/1952  Great Britain.

HENRY C. SUTHERLAND, Primary Examiner

J. L. RIDGILL, Jr., Assistant Examiner

U.S. Cl. X.R.

52—489, 509, 713